United States Patent
Sugiyama

(10) Patent No.: US 11,379,077 B2
(45) Date of Patent: Jul. 5, 2022

(54) TOUCH PANEL INPUT DEVICE

(71) Applicant: SHARP KABUSHIKI KAISHA, Sakai (JP)

(72) Inventor: Koichi Sugiyama, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/335,673

(22) Filed: Jun. 1, 2021

(65) Prior Publication Data

US 2021/0382597 A1    Dec. 9, 2021

(30) Foreign Application Priority Data

Jun. 5, 2020 (JP) .............................. JP2020-098539

(51) Int. Cl.
*G06F 3/041* (2006.01)
*G06F 3/044* (2006.01)

(52) U.S. Cl.
CPC ........ *G06F 3/04166* (2019.05); *G06F 3/0446* (2019.05)

(58) Field of Classification Search
None
See application file for complete search history.

(56) References Cited

U.S. PATENT DOCUMENTS

| | | | |
|---|---|---|---|
| 9,001,080 B2 | 4/2015 | Okayama et al. | |
| 9,785,277 B2* | 10/2017 | Azumi | G09G 3/3648 |
| 10,282,044 B2* | 5/2019 | Min | G06F 3/0445 |
| 2003/0085858 A1* | 5/2003 | Okafuji | G09G 3/3629 345/87 |
| 2003/0234773 A1* | 12/2003 | Sano | G06F 3/0436 345/177 |
| 2007/0074914 A1* | 4/2007 | Geaghan | G06F 3/0445 178/18.06 |
| 2007/0132737 A1* | 6/2007 | Mulligan | G06F 3/0418 345/173 |
| 2011/0001724 A1* | 1/2011 | Choi | G06F 3/0416 345/174 |
| 2011/0037727 A1* | 2/2011 | Lee | G06F 3/04166 345/174 |
| 2011/0090169 A1* | 4/2011 | Karhiniemi | G06F 3/0418 345/173 |
| 2011/0115718 A1* | 5/2011 | Hsieh | G06F 3/0446 345/173 |

(Continued)

FOREIGN PATENT DOCUMENTS

WO    2013/069289 A1    5/2013

*Primary Examiner* — Amy Onyekaba
(74) *Attorney, Agent, or Firm* — ScienBiziP, P.C.

(57) ABSTRACT

A touch panel input device includes a plurality of first electrode lines, a plurality of second electrode lines, a first drive circuit, a second drive circuit, a drive controller, a reception circuit, and a touch detector. The first drive circuit inputs a first drive signal to odd-numbered first electrode lines which are odd-numbered electrode lines among each of the plurality of first electrode lines from a first end portion side. The second drive circuit inputs a second drive signal to even-numbered first electrode lines which are even-numbered electrode lines among each of the plurality of first electrode lines from a second end side. The touch detector detects a touch on the touch surface based on a change in an output signal detected by the reception circuit.

10 Claims, 6 Drawing Sheets

(56) References Cited

U.S. PATENT DOCUMENTS

| | | | | |
|---|---|---|---|---|
| 2012/0139868 A1* | 6/2012 | Mamba | G06F 3/0446 | 345/174 |
| 2012/0182259 A1* | 7/2012 | Han | G06F 3/0418 | 345/174 |
| 2012/0274582 A1* | 11/2012 | Shih | G06F 3/0445 | 345/173 |
| 2014/0043284 A1* | 2/2014 | Park | G06F 3/0446 | 345/174 |
| 2014/0152621 A1* | 6/2014 | Okayama | G06F 3/04182 | 345/174 |
| 2014/0191978 A1* | 7/2014 | Ng | G06F 3/04164 | 345/173 |
| 2015/0060256 A1* | 3/2015 | Kim | G06F 3/0446 | 200/600 |
| 2015/0193053 A1* | 7/2015 | Takagi | G06F 3/0445 | 345/174 |
| 2015/0277657 A1* | 10/2015 | Azumi | G11C 19/28 | 345/174 |
| 2016/0062501 A1* | 3/2016 | Hsu | G06F 3/04883 | 345/174 |
| 2016/0070413 A1* | 3/2016 | Geaghan | G06F 3/04883 | 345/174 |
| 2016/0274708 A1* | 9/2016 | Hwang | G06F 3/0447 | |
| 2016/0274721 A1* | 9/2016 | Ding | G06F 3/04184 | |
| 2017/0038903 A1* | 2/2017 | Sun | G09G 3/36 | |
| 2017/0045989 A1* | 2/2017 | Lee | G06F 3/045 | |
| 2017/0090664 A1* | 3/2017 | Zheng | G06F 3/0445 | |
| 2017/0168635 A1* | 6/2017 | Xiang | G06F 3/0446 | |
| 2017/0192607 A1* | 7/2017 | Chai | G06F 3/04164 | |
| 2018/0173367 A1* | 6/2018 | Mayumi | G06F 3/0412 | |
| 2018/0181787 A1* | 6/2018 | Jee | G06F 3/0416 | |
| 2019/0114027 A1* | 4/2019 | Tanaka | G06F 3/0416 | |
| 2019/0204939 A1* | 7/2019 | Ju | G06F 3/0416 | |
| 2019/0220131 A1* | 7/2019 | Xu | G06F 3/044 | |
| 2020/0073510 A1* | 3/2020 | Mao | G06F 3/0445 | |
| 2020/0104013 A1* | 4/2020 | He | G06F 3/0447 | |
| 2020/0192502 A1* | 6/2020 | Kataya | G06F 3/04166 | |
| 2020/0192503 A1* | 6/2020 | Kataya | G06F 3/04182 | |
| 2020/0192526 A1* | 6/2020 | Kataya | G06F 3/04164 | |
| 2020/0233526 A1* | 7/2020 | Kim | G06F 3/04166 | |
| 2020/0326815 A1* | 10/2020 | Choi | G06F 3/04184 | |
| 2021/0064165 A1* | 3/2021 | Krah | G06F 3/04182 | |
| 2021/0132767 A1* | 5/2021 | Wang | G06F 3/04164 | |
| 2021/0181917 A1* | 6/2021 | Jee | G06F 3/0446 | |
| 2021/0223895 A1* | 7/2021 | Bai | G09G 3/32 | |

\* cited by examiner

TOUCH PANEL INPUT DEVICE

INCORPORATION BY REFERENCE

This application is based upon and claims the benefit of priority from the corresponding Japanese Patent Application No. 2020-98539 filed on Jun. 5, 2020 under 35 USC 119, the entire contents of which is incorporated herein by reference.

BACKGROUND

Field of the Invention

The present disclosure relates to a touch panel input device.

Description of the Background Art

A touch panel input device includes a touch panel, an alternating current (AC) signal source, an inductance element, and a detection circuit. The touch panel has electrode lines. The electrode lines have a first electrode line and a second electrode line. The AC signal source inputs an AC signal to the first electrode line. The inductance element is electrically connected in series between the AC signal source and the first electrode line. The detection circuit detects a change in capacitance between the first electrode line and the second electrode line when an object to be detected touches a touch panel by at least a change in a signal output from the second electrode line.

SUMMARY

According to a first aspect of the present disclosure, a touch panel input device includes a touch surface. The touch panel input device includes a plurality of first electrode lines, a plurality of second electrode lines, a first drive circuit, a second drive circuit, a drive controller, a reception circuit, and a touch detector. The plurality of first electrode lines are arranged to extend from a first end portion of the touch surface toward a second end portion of the touch surface opposing to the first end portion of the touch surface in a first direction. The plurality of second electrode lines are arranged to extend from a third end portion of the touch surface toward the fourth end portion of the touch surface opposing to the third end portion of the touch surface in a second direction, and intersect with the plurality of first electrode lines at a plurality of intersections. The first drive circuit inputs a first drive signal to odd-numbered first electrode lines which are odd-numbered electrode lines among each of the plurality of first electrode lines from the side of the first end portion. The second drive circuit inputs a second drive signal to even-numbered first electrode lines which are even-numbered electrode lines among each of the plurality of first electrode lines from the side of the second end portion. The drive controller controls the first drive circuit and the second drive circuit. The reception circuit detects an output signal on each of the plurality of second electrode lines. The touch detector detects a touch on the touch surface based on a change in the output signals detected by the reception circuit.

DETAILED DESCRIPTION

Figure 1:
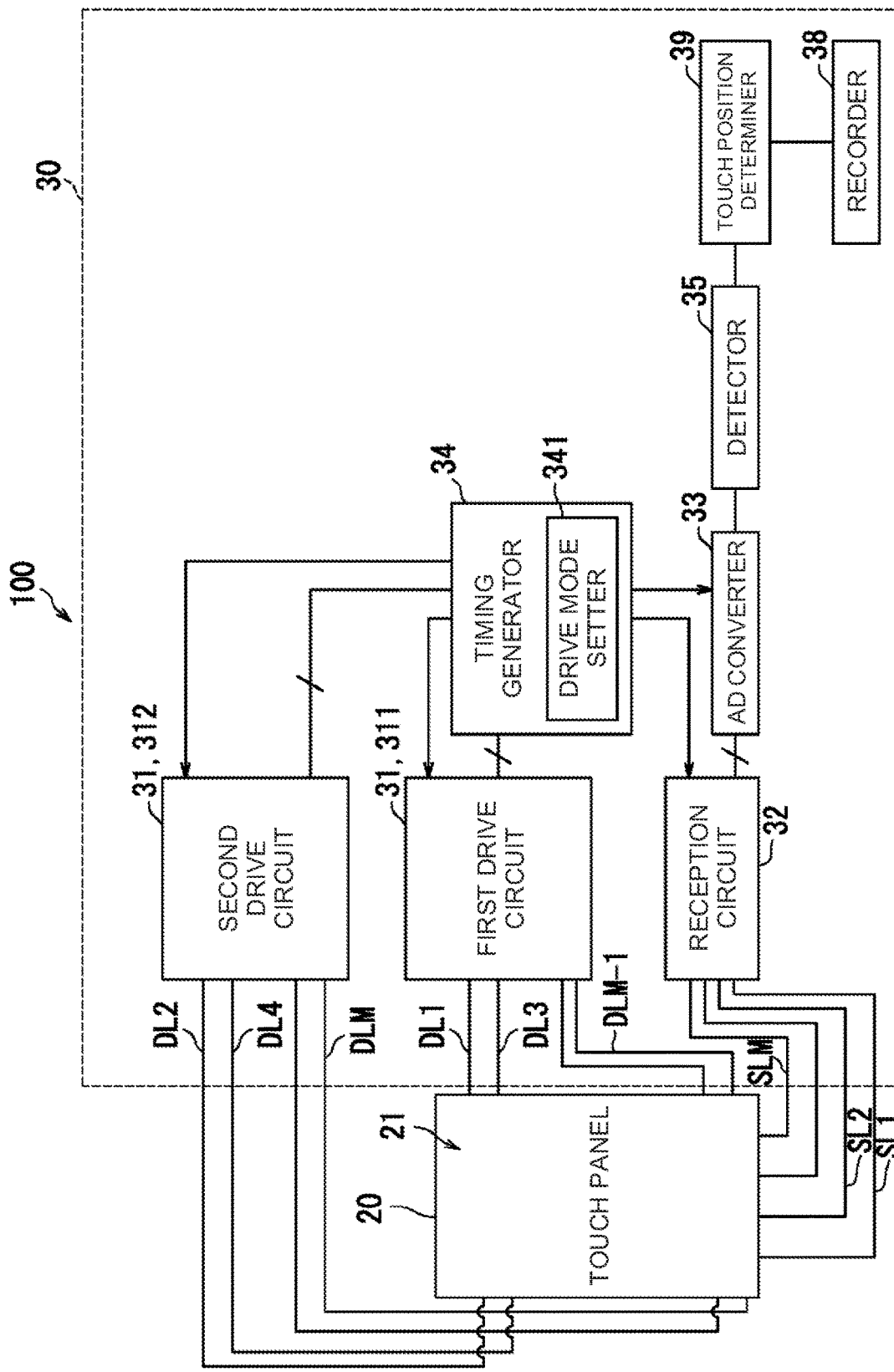
FIG. 1 is a block diagram illustrating a configuration of a touch panel input device according to a first embodiment of the present disclosure.

Hereinafter, embodiments of the present disclosure will be described with reference to the drawings. It should be noted that in the drawings, the same or corresponding portions are denoted by the same reference numerals and the description thereof will not be repeated.

First Embodiment

Figure 2:
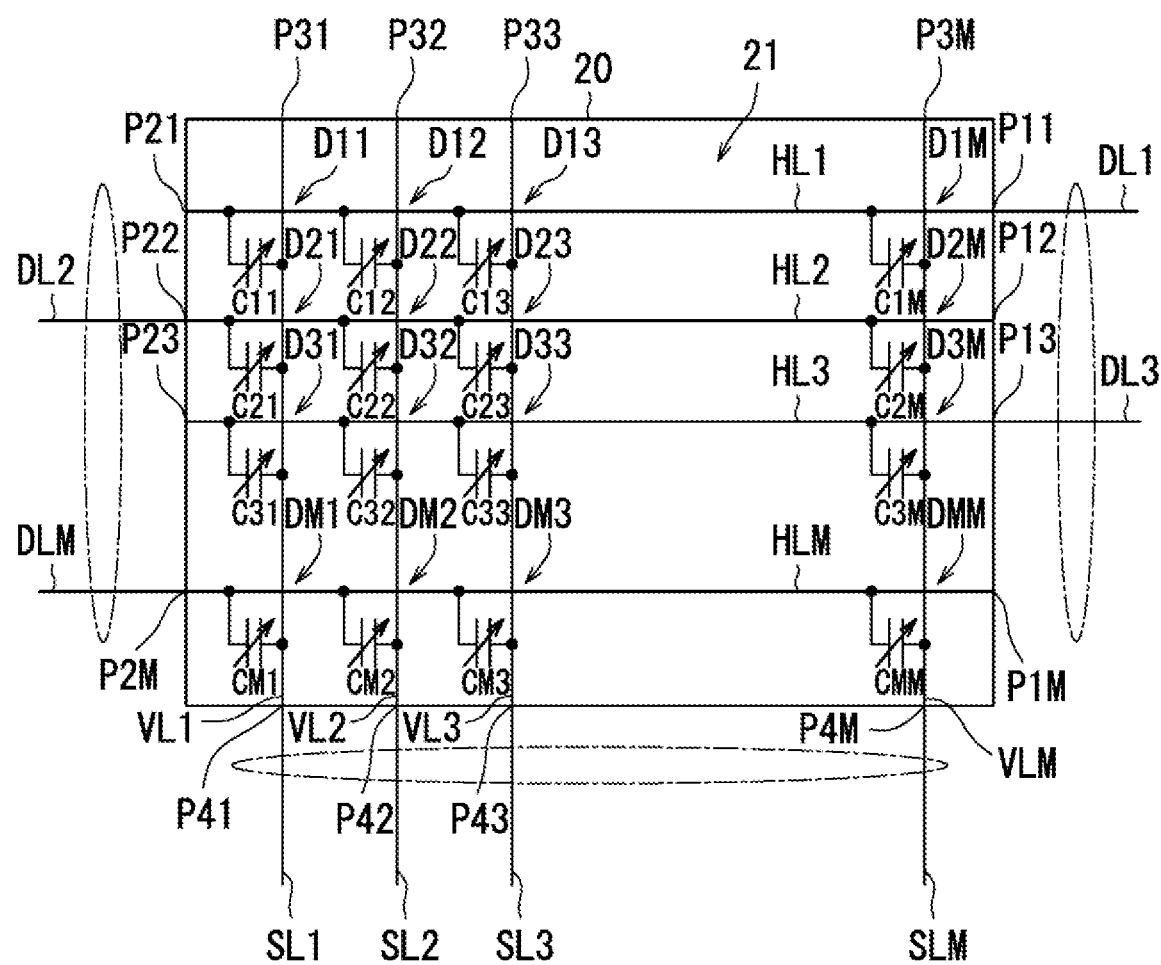
FIG. 2 is a schematic diagram illustrating a configuration of a touch panel provided in the touch panel input device.
Figure 3:
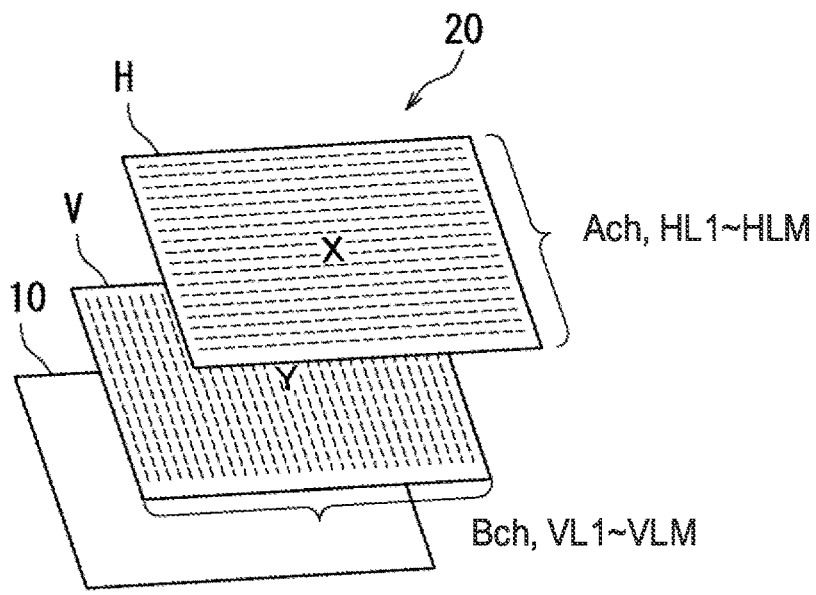
FIG. 3 is an explanatory diagram illustrating a schematic configuration of the touch panel.

A touch panel input device 100 according to a first embodiment of the present disclosure will be described with reference to FIGS. 1 to 3. FIG. 1 is a block diagram illustrating a configuration of the touch panel input device 100 according to the first embodiment of the present disclosure. FIG. 2 is a schematic diagram illustrating a configuration of a touch panel 20 provided in the touch panel input device 100. FIG. 3 is an explanatory diagram illustrating a schematic configuration of the touch panel 20.

As illustrated in FIGS. 1 to 3, the touch panel input device 100 includes a display 10, the touch panel 20, and a touch position determination circuit 30.

The display 10 includes a display panel (for example, a liquid crystal panel) for displaying an image. Note that the touch panel input device 100 does not necessarily have to include the display 10, and it is sufficient that the touch panel input device includes at least the touch panel 20 and the touch position determination circuit 30. That is, it is sufficient that the touch panel input device 100 has at least a touch panel function, and the touch panel input device 100 does not necessarily have to include an image display function for displaying an image on the touch panel 20.

The touch panel 20 includes a touch surface 21, a plurality of first electrode lines, a plurality of second electrode lines, and a plurality of capacitances. The plurality of first electrode lines include first electrode lines HL1 to HLM (Ach). The plurality of second electrode lines include second electrode lines VL1 to VLM (Bch). The plurality of capacitances include capacitances C11 to CMM.

The touch surface 21 receives a touch operation. The touch surface 21 may be a touch surface of an electronic blackboard, for example. Further, the touch surface 21 may be a touch surface of a terminal such as a smartphone and a tablet personal computer (PC).

Each of the first electrode lines HL1 to HLM and the second electrode lines VL1 to VLM is arranged on the back side of the touch surface 21. The first electrode lines HL1 to HLM extend from first end portions P11 to P1M of the touch surface 21 toward second end portions P21 to P2M of the touch surface 21 along a first direction, and are arranged parallel to one another along the first direction. The second end portions P21 to P2M are opposed to the first end portions P11 to P1M in the first direction. According to the present embodiment, the first end portions P11 to P1M are located on the right side of the touch surface 21. Further, the second end portions P21 to P2M are located on the left side of the touch surface 21. The second electrode lines VL1 to VLM extend from third end portions P31 to P3M of the touch surface 21 toward fourth end portions P41 to P4M of the touch surface 21 along a second direction perpendicular to the first direction, and are arranged parallel to one another along the second direction. The third end portions P31 to P3M are opposed to the fourth end portions P41 to P4M in the second direction. According to the present embodiment, the third end portions P31 to P3M are located on the upper side of the touch surface 21. Further, the fourth end portions P41 to P4M are located on the lower side of the touch surface 21. The second electrode lines VL1 to VLM are arranged to intersect with the first electrode lines HL1 to HLM at a plurality of intersections D11 to DMM. The capacitances C11 to CMM are formed at the intersections D11 to DMM respectively between the first electrode lines HL1 to HLM and the second electrode lines VL1 to VLM.

Hereinafter, the first electrode lines HL1 to HLM may be referred to as a first electrode line group H, and the second electrode lines VL1 to VLM may be referred to as a second electrode line group V. Further, the first electrode lines HL1 to HLM and the second electrode lines VL1 to VLM may be collectively referred to as an electrode line. Furthermore, the intersections D11 to DMM may be collectively referred to as an intersection.

The touch panel 20 including the first electrode line group H and the second electrode line group V is fixed by being bonded to the display 10 or a protective glass (not illustrated). The second electrode line group V is disposed closer to the display 10 than the first electrode line group H. Note that the first electrode line group H may be disposed closer to the display 10 than the second electrode line group V. Although a polyethylene terephthalate (PET) film is actually provided between the first electrode line group H, the second electrode line group V and the display 10, the description for the PET film is omitted in the description of FIG. 3.

The touch position determination circuit 30 is configured by, for example, a semiconductor element (central processing unit (CPU), memory, and so on), a resistor, a capacitor, a coil, and the like. The touch position determination circuit 30 detects the distribution of the values of the capacitances C11 to CMM formed at the intersections D11 to DMM between the first electrode lines HL1 to HLM and the second electrode lines VL1 to VLM on the touch panel 20, and determines a touch position representing the touched position on the touch surface 21.

When a touch operation is performed on the touch surface 21, the capacitance of intersections located around the place where the touch operation is performed among the intersections D11 to DMM changes. As a result, the touch position determination circuit 30 determines the touch position on the touch surface 21 based on the change in the capacitance.

The touch position determination circuit 30 includes a drive circuit 31, a reception circuit 32, an analog to digital (AD) converter 33, a timing generator 34, a detector 35, a recorder 38, and a touch position determiner 39. Note that the timing generator 34 is an example of a "drive controller". Further, the touch position determiner 39 is an example of a "touch detector".

The drive circuit 31 includes a first drive circuit 311 and a second drive circuit 312. The drive circuit 31 is connected to the first electrode lines HL1 to HLM.

The first drive circuit 311 is connected to odd-numbered first electrode lines among each of the first electrode lines HL1 to HLM. The odd-numbered first electrode lines are first electrode lines of odd-numbered lines among the first electrode lines HL1 to HLM. The odd-numbered first electrode lines include first electrode lines HL1, HL3, . . . , HLM−1. The first drive circuit 311 is connected to the odd-numbered first electrode lines on the side of the first end portions P11 to P1M−1 via odd-numbered drive lines. The odd-numbered drive lines include drive lines DL1, DL3, . . . , DLM−1.

The second drive circuit 312 is connected to even-numbered first electrode lines among each of the first electrode lines HL1 to HLM. The even-numbered first electrode lines are first electrode lines of even-numbered lines among the first electrode lines HL1 to HLM. The even-numbered first electrode lines include first electrode lines HL2, HL4, . . . , HLM. The second drive circuit 312 is connected to the even-numbered first electrode lines on the side of the second end portions P22 to P2M via even-numbered drive lines. The even-numbered drive lines include drive lines DL2, DL4, . . . , DLM. The second drive circuit 312 inputs a first drive signal to the even-numbered first electrode lines from the side of the second end portions P22 to P2M via the respective even-numbered drive lines.

The drive circuit 31 generates a drive signal by applying a voltage to the first electrode lines HL1 to HLM, and inputs the drive signal to each of the first electrode lines HL1 to HLM. More specifically, the first drive circuit 311 generates the first drive signal. Then, the first drive circuit 311 inputs the first drive signal to the odd-numbered first electrode lines from the side of the first end portions P11 to P1M−1 via the respective odd-numbered drive lines. Further, the second drive circuit 312 generates a second drive signal. Further, the second drive circuit 312 inputs the second drive signal to the even-numbered first electrode lines from the side of the second end portions P22 to P2M via the respective even-numbered drive lines.

The reception circuit 32 is connected to the second electrode lines VL1 to VLM via sense lines SL1 to SLM. The reception circuit 32 detects an output signal on each of the second electrode lines VL1 to VLM. The reception circuit 32 detects the output signals from the second electrode lines VL1 to VLM, and thereby reads information (capacitance information) indicating a linear sum of an electronic charge corresponding to each of the capacitances (capacitances C11 to CMM). Then, the reception circuit 32 transmits the read capacitance information to the AD converter 33. As a result, the AD converter 33 acquires the capacitance information.

The AD converter 33 executes an AD-conversion of the capacitance information acquired from the reception circuit 32, and transmits the AD-converted capacitance information to the detector 35. As a result, the detector 35 acquires the AD-converted capacitance information.

The timing generator 34 controls the first drive circuit 311 and the second drive circuit 312. Specifically, the timing generator 34 generates a signal that regulates the operation of the drive circuit 31 (first drive circuit 311 and second drive circuit 312), a signal that regulates the operation of the reception circuit 32, and a signal that regulates the operation of the AD converter 33, and transmits these signals to the drive circuit 31, the reception circuit 32, and the AD converter 33, respectively. The timing generator 34 includes a drive mode setter 341. The drive mode setter 341 sets a drive mode.

The detector 35 calculates the capacitance distribution on the touch surface 21 based on the capacitance information acquired from the AD converter 33 and the code sequence. That is, the detector 35 detects a detection value (change in capacitance) based on a change in capacitance (capacitances C11 to CMM) at each intersection (each of the intersections D11 to DMM) formed by the plurality of first electrode lines (first electrode lines HL1 to HLM) and the plurality of second electrode lines (second electrode lines VL1 to VLM).

The detector 35 transmits the detection value (information indicating the capacitance distribution) to the touch position determiner 39. As a result, the touch position determiner 39 acquires the detection value from the detector 35.

The recorder 38 records a determination condition. The determination condition indicates information used by the touch position determiner 39 to determine a touch position on the touch surface 21.

The touch position determiner 39 is electrically connected to the reception circuit 32 via the AD converter 33 and the detector 35. The touch position determiner 39 detects a touch on the touch surface 21 based on a change in the output signal detected by the reception circuit 32 due to a change in the capacitance at the intersections D11 to DMM. For example, the touch position determiner 39 determines a touch position on the touch surface 21 based on the distribution of detected values with respect to the coordinates of a plurality of intersections (intersections D11 to DMM) detected by the detector 35 and the determination condition recorded in the recorder 38.

In general, the strength of the drive signal input to the first electrode lines decreases as the distance from the input position increases. For example, the strength of the drive signal input to the first electrode lines from the side of the first end portions P11 to P1M becomes weaker toward the side of the second end portions P21 to P2M. Further, the strength of the drive signal input to the first electrode lines from the side of the second end portions P21 to P2M becomes weaker toward the side of the first end portions P11 to P1M. Therefore, in general, there is a possibility that the strength of the drive signal is biased depending on the position of the touch surface.

According to the present embodiment, the first drive circuit 311 inputs the first drive signal from the side of the first end portions P11 to the P1M to the odd-numbered first electrode lines which are the odd-numbered electrode lines among each of the plurality of first electrode lines. On the other hand, the second drive circuit 312 inputs the second drive signal from the side of the second end portions P21 to the P2M to the even-numbered first electrode lines which are the even-numbered electrode lines among each of the plurality of first electrode lines. Therefore, it is possible to reduce the occurrence of deviation of the drive signal depending on the position of the touch surface 21. Therefore, it is possible to suppress variations in detection accuracy depending on the position of the touch surface 21. As a result, it is possible to suppress deterioration in the determination accuracy of the touch position.

The touch position determiner 39 calculates the touch signal strength of one touch based on the signal strength of the output signals corresponding to a plurality of intersections (intersections D11 to DMM) corresponding to the one touch detected by the reception circuit 32. Specifically, the touch position determiner 39 averages the signal strength of the output signal corresponding to the intersection corresponding to each of the odd-numbered first electrode lines and the signal strength of the output signal corresponding to the intersection corresponding to each of the even-numbered first electrode lines, so as to calculate the touch signal strength of one touch. That is, the touch position determiner 39 averages the signal strength of an odd-numbered first electrode line and an even-numbered first electrode line which are adjacently placed to each other so as to calculate the touch signal strength of one touch. Therefore, it is possible to mitigate the occurrence of deviation in the strength of the drive signal depending on the position of the touch surface 21. Therefore, it is possible to suppress variations in detection accuracy depending on the position of the touch surface 21. As a result, it is possible to suppress deterioration in the determination accuracy of the touch position.

Figure 4:
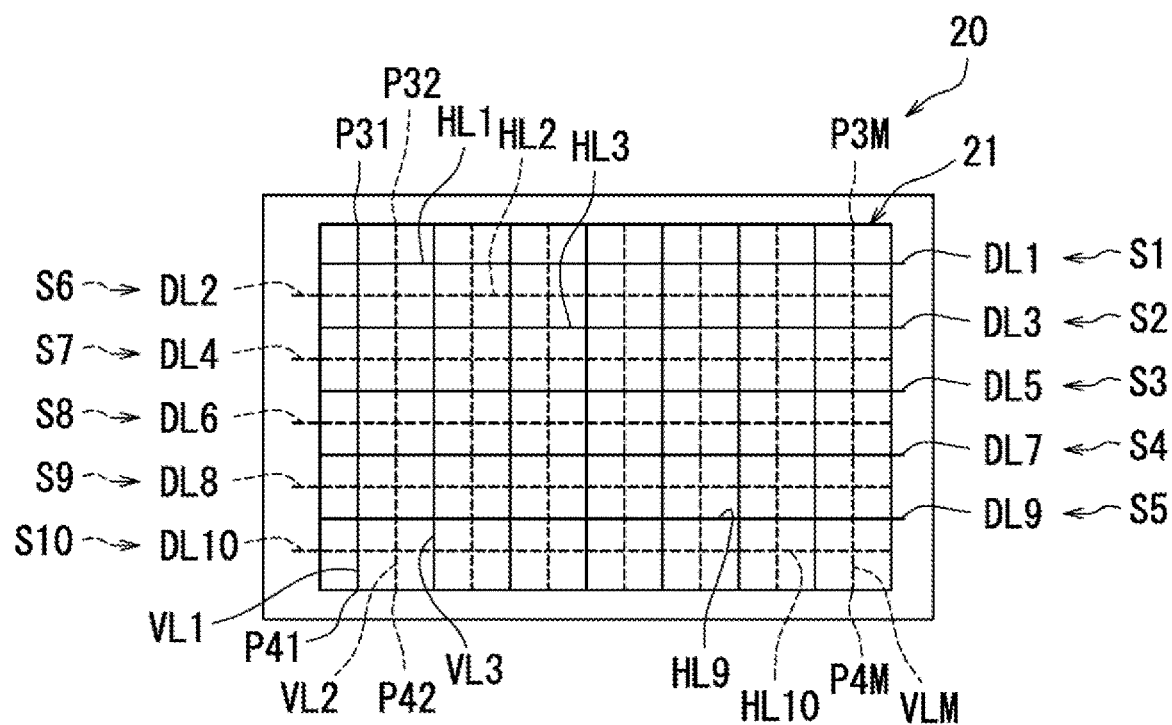
FIG. 4 is a schematic diagram illustrating the touch panel.

Next, an example of drive control executed by the timing generator 34 will be described with reference to FIGS. 1 and 4. FIG. 4 is a schematic diagram illustrating the touch panel 20. For ease of understanding, the number of the first electrode lines HL is set to ten in FIG. 4.

The timing generator 34 executes interlace drive control for alternately executing first drive control and second drive control.

The first drive control is control in which the first drive circuit 311 sequentially inputs a signal to the odd-numbered first electrode lines (first electrode lines HL1, HL3, . . . , HL9) in the order of arrangement from the line of the side of the third end portions P31 to P3M to the line of the side of the fourth end portions P41 to P4M. According to the present embodiment, the first drive control is control in which the signal is sequentially input to the odd-numbered first electrode lines (first electrode lines HL1, HL3, . . . , HL9) in the order of arrangement from the upper side to the lower side. As illustrated in FIG. 4, the first drive control is control in which the first drive circuit 311 inputs the first drive signal to the odd-numbered first electrode lines through the drive lines (drive lines DL1, DL3, . . . , DL9) in the order of steps S1 to S5. As described above, the first drive control controls to input the drive signal to the first electrode lines HL at every other line.

The second drive control is control in which the second drive circuit 312 sequentially inputs a signal to the even-numbered first electrode lines (first electrode lines HL2, HL4, . . . , HL10) in the order of arrangement from the line of the side of the third end portions P31 to P3M to the line of the side of the fourth end portions P41 to P4M. According to the present embodiment, the second drive control is control in which the signal is sequentially input to the even-numbered first electrode lines (first electrode lines HL2, HL4, . . . , HL10) in the order of arrangement from the upper side to the lower side. As illustrated in FIG. 4, the second drive control is control in which the second drive circuit 312 inputs the second drive signal through the drive lines (drive lines DL2, DL4, . . . , DL10) in the order of step S6 to step S10. As described above, the second drive control controls to input the drive signal to the first electrode lines HL at every other line.

As described above with reference to FIGS. 1 and 4, the drive controller (timing generator 34) executes interlace drive control for alternately executing the first drive control and the second drive control. Therefore, the drive signal is input to the plurality of first electrode lines (first electrode lines HL1 to HLM) at every other line. Therefore, it is possible to suppress crosstalk. As a result, it is possible to suppress deterioration in the determination accuracy of the touch position.

Figure 5:
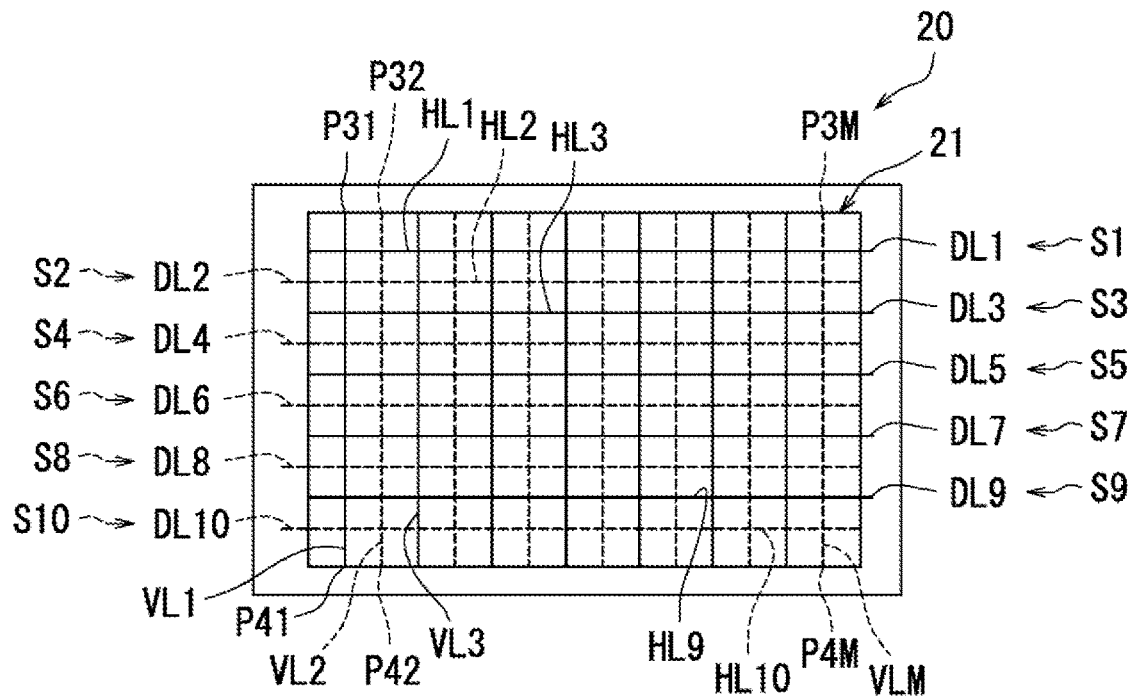
FIG. 5 is a schematic diagram illustrating the touch panel.

Next, an example of drive control executed by the timing generator 34 will be described with reference to FIGS. 1 and 5. FIG. 5 is a schematic diagram illustrating the touch panel 20. For ease of understanding, the number of the first electrode lines HL is set to ten in FIG. 5.

The timing generator 34 may execute non-interlace drive control. The non-interlace drive control is drive control in which the first drive circuit 311 and the second drive circuit 312 sequentially input signals to all of the electrode lines among each of the plurality of first electrode lines (first electrode lines HL1 to HLM) in the order of arrangement from the line of the side of the third end portions P31 to P3M to the line of the side of the fourth end portions P41 to P4M. As illustrated in FIG. 5, in the non-interlace drive control, the control in which the first drive circuit 311 inputs the first drive signal through the drive lines and the control in which the second drive circuit 312 inputs the second drive signal through the drive lines are alternately executed in the order of step S1 to step S10.

Note that the drive mode setter 341 may set the drive mode to either an interlace drive mode or a non-interlace drive mode. As illustrated in FIG. 4, the interlace drive mode is a drive mode in which the timing generator 34 executes the interlace drive control. As illustrated in FIG. 5, the non-interlace drive mode is a drive mode in which the timing generator 34 executes the non-interlace driving control. The drive mode setter 341 may set the drive mode to either the interlace drive mode or the non-interlace drive mode according to the drive mode set by the user, for example.

Note that the drive mode setter 341 may set the drive mode in accordance with the movement speed in the touch surface of a touch input to the touch surface 21.

Figure 6:
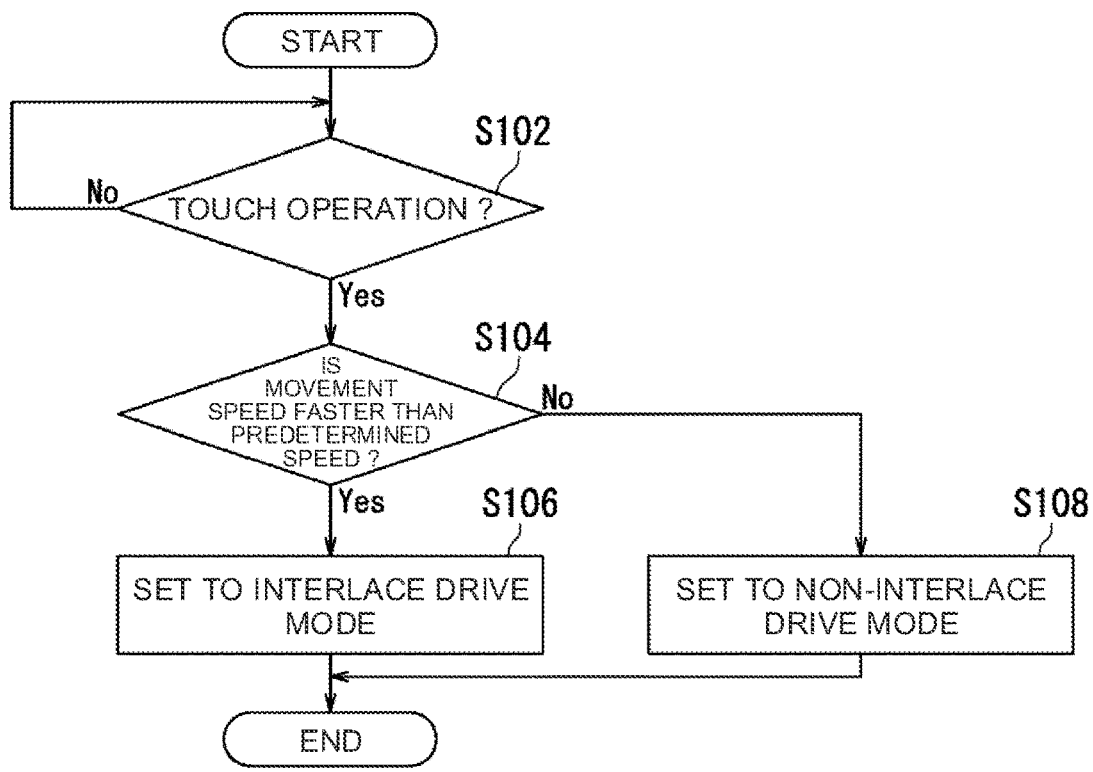
FIG. 6 is a flow chart illustrating processing of setting a drive mode by a drive mode setter.

The processing of setting the drive mode by the drive mode setter 341 will be described with reference to FIGS. 1 and 6. FIG. 6 is a flow chart illustrating the processing of setting the drive mode using the drive mode setter 341.

As illustrated in FIG. 6, in step S102, the touch position determiner 39 determines whether a touch operation has been performed on the touch surface 21 based on the detection value of the detector 35.

When the detector 35 detects a change in capacitance at at least one intersection among the plurality of intersections (each of the intersections D11 to DMM), the touch position determiner 39 determines that a touch operation has been performed (Yes in step S102). In this case, the processing proceeds to step S104.

On the other hand, when the detector 35 does not detect a change in capacitance at any intersection among the plurality of intersections, the touch position determiner 39 determines that no touch operation has been performed (No in step S102). In this case, the processing illustrated in step S102 is repeated.

In step S104, the drive mode setter 341 determines whether the movement speed in the tough surface of the touch input to the touch surface 21 is equal to or greater than a predetermined speed. When the drive mode setter determines that the movement speed is equal to or greater than the predetermined speed (Yes in step S104), the processing proceeds to step S106. When the drive mode setter determines that the movement speed is not equal to or greater than the predetermined speed (No in step S104), the processing proceeds to step S108.

In step S106, the drive mode setter 341 sets the drive mode to the interlace drive mode. As a result, the processing ends.

In step S108, the drive mode setter 341 sets the drive mode to the non-interlace drive mode. As a result, the processing ends.

As described above with reference to FIGS. 1 and 6, when the drive mode setter 341 determines that the movement speed of a touch input is equal to or greater than the predetermined speed, the drive mode setter 341 sets the drive mode to the interlace drive mode. On the other hand, when the drive mode setter 341 determines that the movement speed of the touch input is not equal to or greater than the predetermined speed, the drive mode setter 341 sets the drive mode to the non-interlace drive mode. Therefore, when the movement speed of the touch input is fast, the drive signal is input to every other first electrode line among the plurality of first electrode lines (first electrode lines HL1 to HLM) by setting the interlace drive mode. Therefore, the detection speed of the touch can be doubled. As a result, even when the movement speed of the touch input is fast, it is possible to suppress deterioration in the determination accuracy of the touch position.

Note that the drive mode setter 341 may set the drive mode to the interlace drive mode when the touch panel input device 100 is in a signal standby state. As a result, it is possible to reduce power consumption.

Second Embodiment

Figure 7:
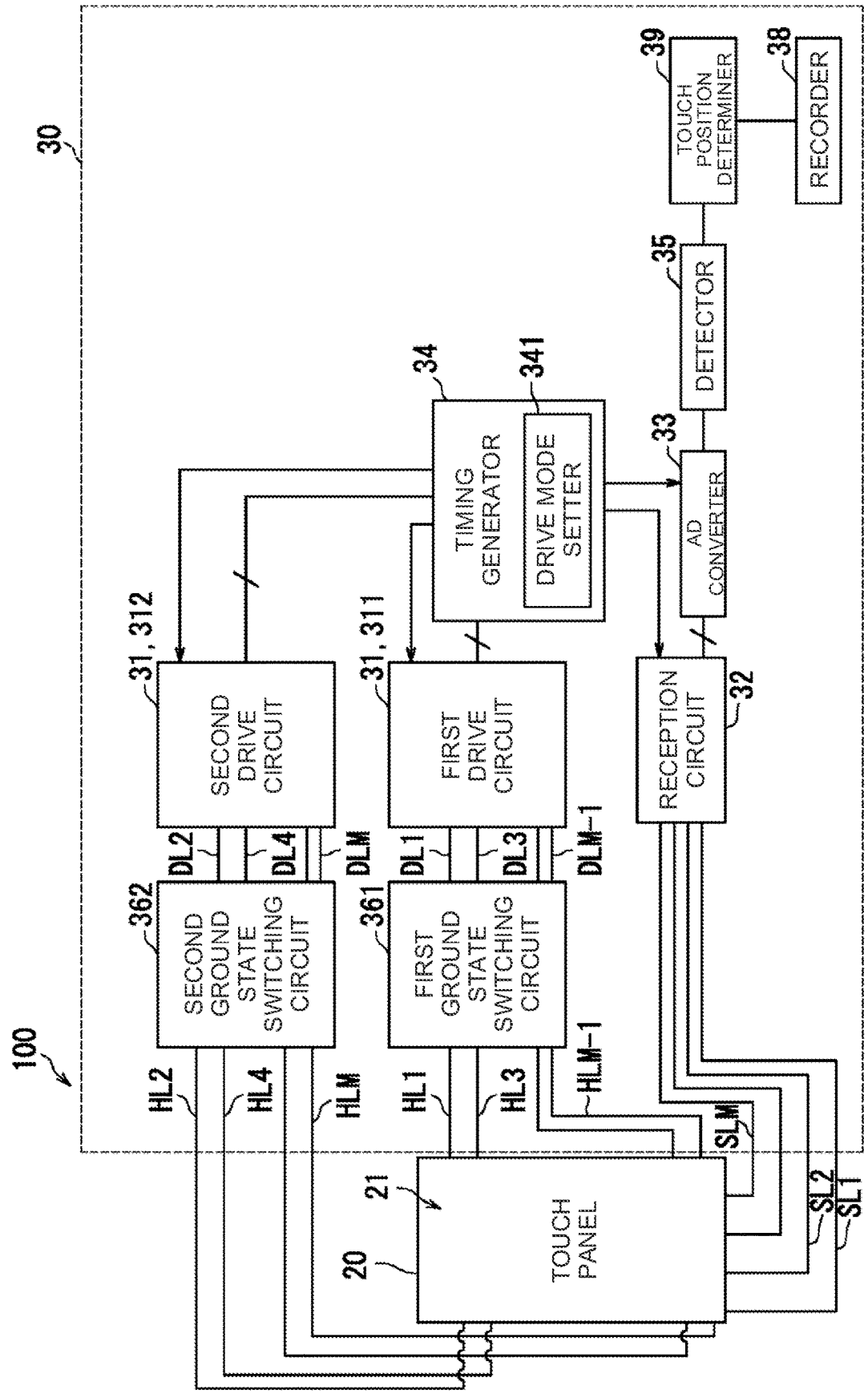
FIG. 7 is a block diagram illustrating a configuration of a touch panel input device according to a second embodiment of the present disclosure.
Figure 8:
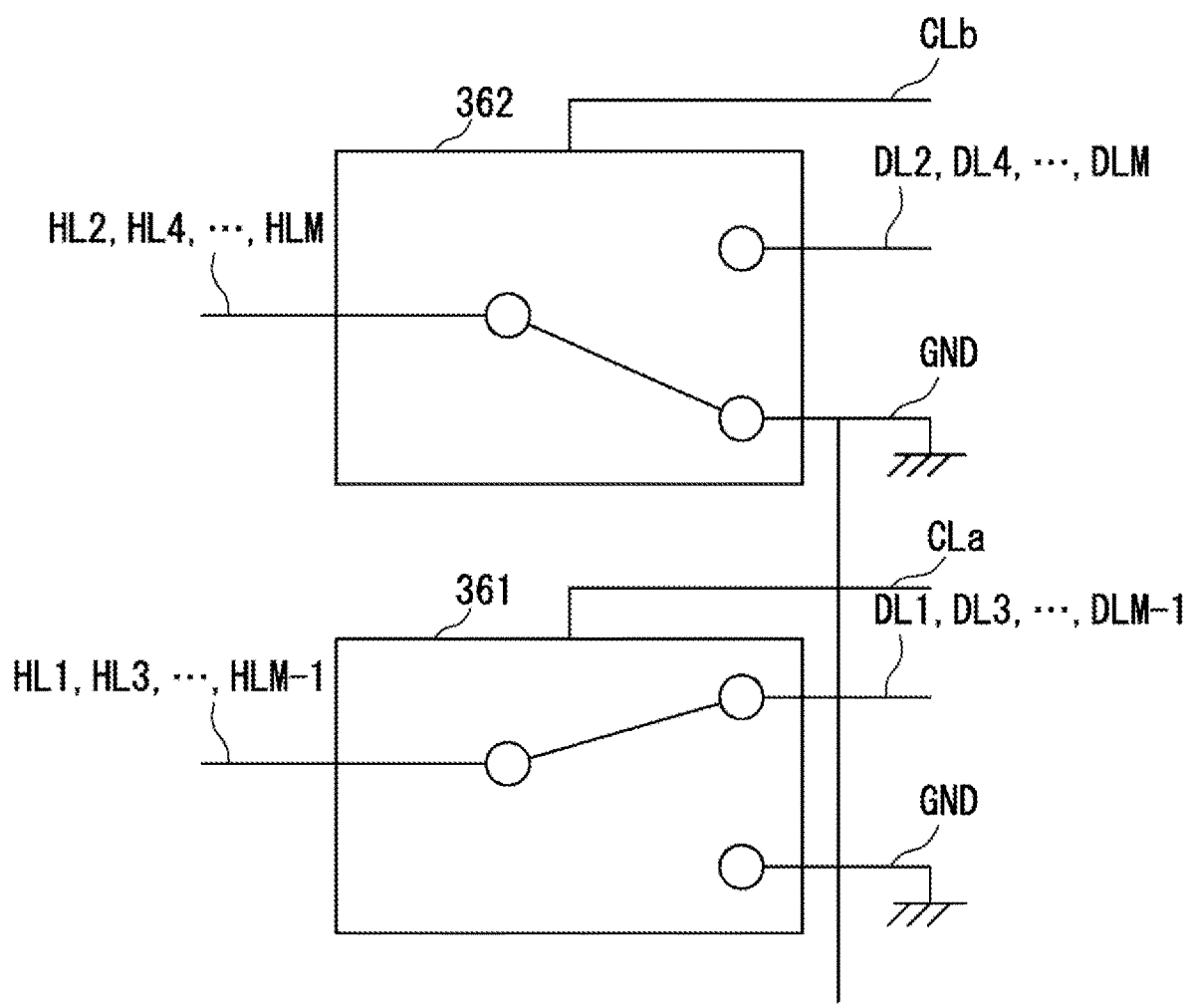
FIG. 8 is a diagram illustrating a first ground state switching circuit and a second ground state switching circuit.

The touch panel input device 100 according to a second embodiment of the present disclosure will be described with reference to FIGS. 7 and 8. FIG. 7 is a block diagram illustrating a configuration of the touch panel input device 100 according to the second embodiment of the present disclosure. FIG. 8 is a diagram illustrating a first ground state switching circuit 361 and a second ground state switching circuit 362. The touch panel input device 100 according to the second embodiment is mainly different from the touch panel input device 100 according to the first embodiment in that the touch position determination circuit 30 further includes the first ground state switching circuit 361 and the second ground state switching circuit 362. Hereinafter, the difference between the second embodiment and the first embodiment will be mainly described.

As illustrated in FIG. 7, the touch position determination circuit 30 further includes the first ground state switching circuit 361 and the second ground state switching circuit 362 in addition to the drive circuit 31, the reception circuit 32, the AD converter 33, the timing generator 34, the detector 35, the recorder 38, and the touch position determiner 39.

The first drive circuit 311 is connected to the odd-numbered first electrode lines (first electrode lines HL1, HL3, . . . , HLM−1) via the first ground state switching circuit 361. The first drive circuit 311 is connected to the first ground state switching circuit 361 via the odd-numbered drive lines DL1, DL3, . . . , DLM−1.

The second drive circuit 312 is connected to the even-numbered first electrode lines (first electrode lines HL2, HL4, . . . , HLM) via the second ground state switching circuit 362. The second drive circuit 312 is connected to the second ground state switching circuit 362 via the even-numbered drive lines DL2, DL4, . . . , DLM.

As illustrated in FIG. 8, the drive lines DL1, DL3, . . . , DLM−1, a control line CLa, a ground GND, and the odd-numbered first electrode lines (first electrode lines HL1, HL3, . . . , HLM−1) are connected to the first ground state switching circuit 361. The first ground state switching circuit 361 switches a ground state or a non-ground state of the odd-numbered first electrode lines (first electrode lines HL1, HL3, . . . , HLM−1).

The drive lines DL2, DL4, . . . , DLM, a control line CLb, the ground GND, and the even-numbered first electrode lines (first electrode lines HL2, HL4, . . . , HLM) are connected to the second ground state switching circuit 362.

The second ground state switching circuit 362 switches the ground state or the non-ground state of the even-numbered first electrode lines (first electrode lines HL2, HL4, . . . , HLM).

The timing generator 34 executes the first drive control and the second drive control. It is preferable that the timing generator 34 alternately executes the first drive control and the second drive control.

The first drive control is control in which the first drive circuit 311 inputs the first drive signal to the odd-numbered first electrode lines (first electrode lines HL1, HL3, . . . , HLM−1), in a state in which the first ground state switching circuit 361 sets the electrode lines of the odd-numbered first electrode lines (first electrode lines HL1, HL3, . . . , HLM−1) to the non-ground state and the second ground state switching circuit 362 sets the electrode lines of the even-numbered first electrode lines (first electrode lines HL2, HL4, . . . , HLM) to the ground state.

The second drive control is control in which the second drive circuit 312 inputs the second drive signal to the even-numbered first electrode lines (first electrode lines HL2, HL4, . . . , HLM), in a state in which the first ground state switching circuit 361 sets the electrode lines of the odd-numbered first electrode lines (first electrode lines HL1, HL3, . . . , HLM−1) to the ground state and the second ground state switching circuit 362 sets the electrode lines of the even-numbered first electrode lines (first electrode lines HL2, HL4, . . . , HLM) to the non-ground state.

As described above, when the timing generator 34 drives the odd-numbered first electrode lines (first electrode lines HL1, HL3, . . . , HLM−1) (sets to the non-ground state), the timing generator 34 controls the even-numbered first electrode lines (first electrode lines HL2, HL4, . . . , HLM) to be in the ground state. On the other hand, when the timing generator 34 drives the even-numbered first electrode lines (first electrode lines HL2, HL4, . . . , HLM) (sets to the non-ground state), the timing generator 34 controls the odd-numbered first electrode lines (first electrode lines HL1, HL3, . . . , HLM−1) to be in the ground state. Therefore, it is possible to suppress crosstalk. Therefore, it is possible to reduce noise. As a result, it is possible to suppress deterioration in the determination accuracy of the touch position.

The embodiments of the present disclosure have been described above with reference to the drawings (FIGS. 1 to 8). However, the present disclosure is not limited to the above-described embodiments, and can be implemented without departing from the gist of the embodiments (for example, (1)). Further, various disclosures can also be made by appropriately combining the plurality of components disclosed in the above-described embodiments. For example, some components may be removed from all the components illustrated in the embodiments. In the drawings, for the sake of easy understanding, each component is schematically illustrated, and the number and the like of each component illustrated in the drawings may be different from actual number and the like due to the convenience of drawing preparation. Further, each component illustrated in the above embodiments is an example, and is not particularly limited, and various modifications can be made without substantially deviating from the effects of the present disclosure.

(1) In the first and second embodiments, the touch panel input device 100 inputs the drive signal to the first electrode lines HL1 to HLM and detects the output signals from the second electrode lines VL1 to VLM. However, the present disclosure is not limited to the configuration. The touch panel input device 100 may alternately execute processing for inputting the drive signal to the first electrode lines HL1 to HLM and detecting the output signals from the second electrode lines VL1 to VLM, and processing for inputting the drive signal to the second electrode lines VL1 to VLM and detecting the output signals from the first electrode lines HL1 to HLM.

What is claimed is:

1. A touch panel input device comprising a touch surface, the touch panel input device comprising:
    a plurality of first electrode lines arranged to extend from a first end portion of the touch surface toward a second end portion of the touch surface opposed to the first end portion in a first direction;
    a plurality of second electrode lines arranged to extend from a third end portion of the touch surface toward a fourth end portion of the touch surface opposed to the second end portion in a second direction, and intersect with the plurality of first electrode lines at a plurality of intersections;
    a first drive circuit that inputs a first drive signal from the side of the first end portion to odd-numbered first electrode lines which are odd-numbered electrode lines among each of the plurality of first electrode lines;
    a second drive circuit that inputs a second drive signal from the side of the second portion to even-numbered first electrode lines which are even-numbered electrode lines among each of the plurality of first electrode lines;
    a drive controller that controls the first drive circuit and the second drive circuit;
    a reception circuit that detects an output signal on each of the plurality of second electrode lines; and
    a touch detector that detects a touch on the touch surface based on a change in the output signals detected by the reception circuit,
    wherein the touch detector calculates touch signal strength of one touch based on signal strength of the output signals corresponding to plural intersections among the plurality of intersections corresponding to the one touch detected by the reception circuit.

2. The touch panel input device according to claim 1, wherein the touch detector calculates touch signal strength of the one touch by averaging signal strength of the output signals corresponding to the intersections corresponding to the odd-numbered first electrode lines and signal strength of the output signals corresponding to the intersections corresponding to the even-numbered first electrode lines.

3. The touch panel input device according to claim 1, wherein the drive controller executes interlace drive control to alternately execute first drive control in which the first drive circuit sequentially inputs a signal to the odd-numbered first electrode lines from a line on the side of the third end portion to a line on the side of the fourth end portion in the order of arrangement and second drive control in which the second drive circuit sequentially inputs a signal to the even-numbered first electrode lines from a line on the side of the third end portion to a line on the side of the fourth end portion in the order of arrangement.

4. The touch panel input device according to claim 1, wherein the drive controller executes non-interlace drive control in which the first drive circuit and the second drive circuit sequentially input an input signal to all the electrode lines among each of the plurality of first electrode lines from a line on the side of the third end portion to a line on the side of the fourth end portion in the order of arrangement.

5. The touch panel input device according to claim 1,
wherein the drive controller comprises a drive mode setting circuit that sets a drive mode, and
wherein the drive mode setting circuit sets the drive mode to either of an interlace drive mode for alternatively executing first drive control in which the first drive circuit sequentially inputs a signal to the odd-numbered first electrode lines from a line on the side of the third end portion to a line on the side of the fourth end portion in the order of arrangement and second drive control in which the second drive circuit sequentially inputs a signal to the even-numbered first electrode lines from a line on the side of the third end portion to a line on the side of the fourth end portion in the order of arrangement, and a non-interlace drive mode in which the first drive circuit and the second drive circuit sequentially input an input signal to all the electrode lines among each of the plurality of first electrode lines from a line on the side of the third end portion to a line on the side of the fourth end portion in the order of arrangement.

6. The touch panel input device according to claim 5,
wherein the drive mode setting circuit determines whether a movement speed in the touch surface of a touch input to the touch surface is equal to or greater than a predetermined speed, sets the drive mode to the interlace drive mode when the drive mode setting circuit determines that the movement speed is equal to or greater than the predetermined speed, and sets the drive mode to the non-interlace drive mode when the drive mode setting circuit determines that the movement speed is not equal to or greater than the predetermined speed.

7. The touch panel input device according to claim 5,
wherein the drive mode setting circuit sets the drive mode to the interlace drive mode when the touch panel input device is in a signal standby state.

8. The touch panel input device according to claim 1, the touch panel input device further comprising:
a first ground state switching circuit that switches between a ground state and a non-ground state of the odd-numbered first electrode lines; and
a second ground state switching circuit that switches between a ground state and a non-ground state of the even-numbered first electrode lines,
wherein the drive controller controls such that the first drive circuit inputs the first drive signal to the odd-numbered first electrode lines in a state where the electrode lines of the odd-numbered first electrode lines are set to a non-ground state by the first ground state switching circuit and the electrode lines of the even-numbered first electrode lines are set to a ground state by the second ground state switching circuit, and the second drive circuit inputs the second drive signal to the even-numbered first electrode lines in a state where the electrode lines of the odd-numbered first electrode lines are set to a ground state by the first ground state switching circuit and the electrode lines of the even-numbered first electrode lines are set to a non-ground state by the second ground state switching circuit.

9. A touch panel input device comprising a touch surface, the touch panel input device comprising:
a plurality of first electrode lines arranged to extend from a first end portion of the touch surface toward a second end portion of the touch surface opposed to the first end portion in a first direction;
a plurality of second electrode lines arranged to extend from a third end portion of the touch surface toward a fourth end portion of the touch surface opposed to the second end portion in a second direction, and intersect with the plurality of first electrode lines at a plurality of intersections;
a first drive circuit that inputs a first drive signal from the side of the first end portion to odd-numbered first electrode lines which are odd-numbered electrode lines among each of the plurality of first electrode lines;
a second drive circuit that inputs a second drive signal from the side of the second portion to even-numbered first electrode lines which are even-numbered electrode lines among each of the plurality of first electrode lines;
a drive controller that controls the first drive circuit and the second drive circuit;
a reception circuit that detects an output signal on each of the plurality of second electrode lines; and
a touch detector that detects a touch on the touch surface based on a change in the output signals detected by the reception circuit,
wherein the drive controller comprises a drive mode setting circuit that sets a drive mode, and
wherein the drive mode setting circuit sets the drive mode to either of an interlace drive mode for alternatively executing first drive control in which the first drive circuit sequentially inputs a signal to the odd-numbered first electrode lines from a line on the side of the third end portion to a line on the side of the fourth end portion in the order of arrangement and second drive control in which the second drive circuit sequentially inputs a signal to the even-numbered first electrode lines from a line on the side of the third end portion to a line on the side of the fourth end portion in the order of arrangement, and a non-interlace drive mode in which the first drive circuit and the second drive circuit sequentially input an input signal to all the electrode lines among each of the plurality of first electrode lines from a line on the side of the third end portion to a line on the side of the fourth end portion in the order of arrangement.

10. A touch panel input device comprising a touch surface, the touch panel input device comprising:
a plurality of first electrode lines arranged to extend from a first end portion of the touch surface toward a second end portion of the touch surface opposed to the first end portion in a first direction;
a plurality of second electrode lines arranged to extend from a third end portion of the touch surface toward a fourth end portion of the touch surface opposed to the second end portion in a second direction, and intersect with the plurality of first electrode lines at a plurality of intersections;
a first drive circuit that inputs a first drive signal from the side of the first end portion to odd-numbered first electrode lines which are odd-numbered electrode lines among each of the plurality of first electrode lines;
a second drive circuit that inputs a second drive signal from the side of the second portion to even-numbered first electrode lines which are even-numbered electrode lines among each of the plurality of first electrode lines;
a drive controller that controls the first drive circuit and the second drive circuit;
a reception circuit that detects an output signal on each of the plurality of second electrode lines;

a touch detector that detects a touch on the touch surface based on a change in the output signals detected by the reception circuit,
a first ground state switching circuit that switches between a ground state and a non-ground state of the odd-numbered first electrode lines; and
a second ground state switching circuit that switches between a ground state and a non-ground state of the even-numbered first electrode lines,
wherein the drive controller controls such that the first drive circuit inputs the first drive signal to the odd-numbered first electrode lines in a state where the electrode lines of the odd-numbered first electrode lines are set to a non-ground state by the first ground state switching circuit and the electrode lines of the even-numbered first electrode lines are set to a ground state by the second ground state switching circuit, and the second drive circuit inputs the second drive signal to the even-numbered first electrode lines in a state where the electrode lines of the odd-numbered first electrode lines are set to a ground state by the first ground state switching circuit and the electrode lines of the even-numbered first electrode lines are set to a non-ground state by the second ground state switching circuit.

\* \* \* \* \*